United States Patent
Blinick et al.

(10) Patent No.: US 9,086,972 B2
(45) Date of Patent: Jul. 21, 2015

(54) MANAGING METADATA FOR CACHING DEVICES DURING SHUTDOWN AND RESTART PROCEDURES

(71) Applicant: International Business Machines Corporation, Armonk, NY (US)

(72) Inventors: Stephen L. Blinick, Tucson, AZ (US); Clement L. Dickey, San Jose, CA (US); Xioa-Yu Hu, Horgen (CH); Nikolas Ioannou, Zurich (CH); Ioannis Koltsidas, Zurich (CH); Paul H. Muench, San Jose, CA (US); Roman Pletka, Uster (CH); Sangeetha Seshadri, Vancouver, WA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 254 days.

(21) Appl. No.: 13/937,133

(22) Filed: Jul. 8, 2013

(65) Prior Publication Data

US 2015/0012706 A1   Jan. 8, 2015

(51) Int. Cl.
*G06F 12/08* (2006.01)
*G06F 17/30* (2006.01)

(52) U.S. Cl.
CPC ........ *G06F 12/0802* (2013.01); *G06F 12/0817* (2013.01); *G06F 12/0891* (2013.01); *G06F 17/3048* (2013.01)

(58) Field of Classification Search
CPC ............ G06F 12/0817; G06F 12/0891; G06F 17/3048
See application file for complete search history.

(56) References Cited

U.S. PATENT DOCUMENTS

| 5,978,911 A | 11/1999 | Knox et al. |
| 6,345,294 B1 | 2/2002 | O'toole et al. |
| 6,584,548 B1 * | 6/2003 | Bourne et al. ............. 711/134 |
| 7,310,684 B2 | 12/2007 | Patrick et al. |

(Continued)

FOREIGN PATENT DOCUMENTS

JP    06-187274    7/1994

OTHER PUBLICATIONS

English Abstract for JP06-187274, App. No. JP04340551 filed Dec. 21, 1992 by Hitachi Ltd.

(Continued)

*Primary Examiner* — Ryan Bertram
(74) *Attorney, Agent, or Firm* — David W. Victor; Konrad Raynes Davda & Victor LLP

(57) ABSTRACT

A computer program product, system, and method for managing metadata for caching devices during shutdown and restart procedures. Fragment metadata for each fragment of data from the storage server stored in the cache device is generated. The fragment metadata is written to at least one chunk of storage in the cache device in a metadata directory in the cache device. For each of the at least one chunk in the cache device to which the fragment metadata is written, chunk metadata is generated for the chunk and writing the generated chunk metadata to the metadata directory in the cache device. Header metadata having information on access of the storage server is written to the metadata directory in the cache device. The written header metadata, chunk metadata, and fragment metadata are used to validate the metadata directory and the fragment data in the cache device during a restart operation.

24 Claims, 8 Drawing Sheets

(56) References Cited

U.S. PATENT DOCUMENTS

| | | |
|---|---|---|
| 7,603,440 B1 | 10/2009 | Grabowski et al. |
| 8,195,610 B1 | 6/2012 | Traband et al. |
| 8,898,728 B2 * | 11/2014 | Sreehari et al. .................. 726/1 |
| 2004/0117358 A1 | 6/2004 | von Kaenel et al. |
| 2011/0153755 A1 | 6/2011 | Slavich et al. |
| 2012/0005431 A1 * | 1/2012 | Gross et al. .................. 711/130 |

OTHER PUBLICATIONS

English Machine Translation of JP06-187274, App. No. JP04340551 filed Dec. 21, 1992 by Hitachi Ltd.

* cited by examiner

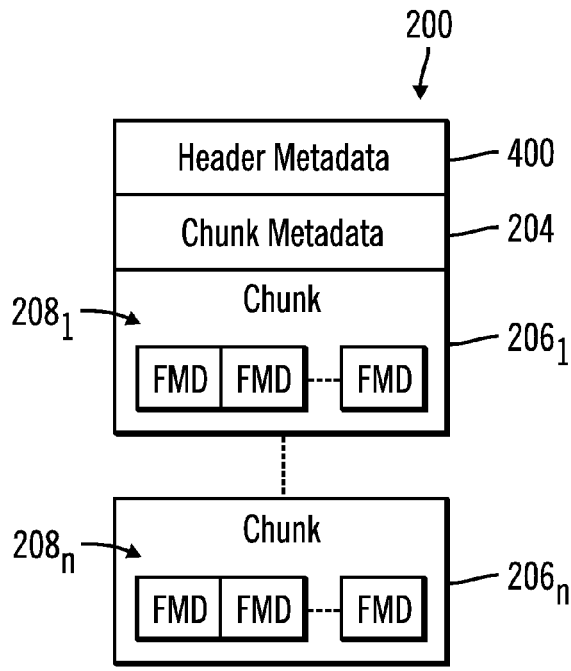

FIG. 2

| Name | Description |
|---|---|
| Logical Device ID | Logical device or LUN identifier. |
| Fragment ID | Fragment identifier. |
| Sector Bitmap | A bitmap for the F sectors of the fragment, where bit 0 corresponds to the first sector, bit 1 to the second sector, bit F-1 to the last sector, etc. A set bit indicates a valid sector, while a reset one indicates an invalid sector. |
| Cache Device Location | A description of the offset on the cache device where the fragment is stored. |

Fragment Metadata

FIG. 3

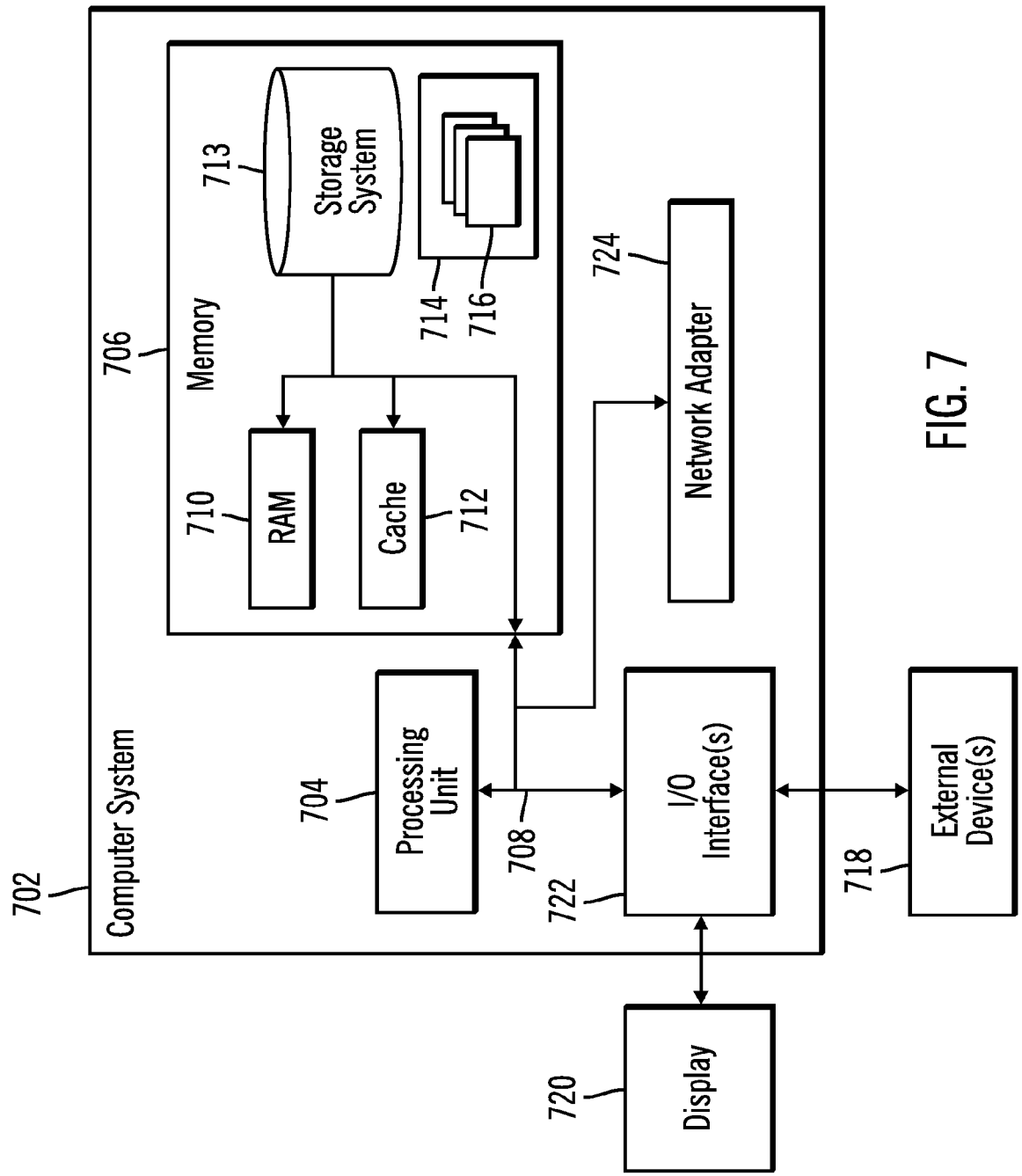

MANAGING METADATA FOR CACHING DEVICES DURING SHUTDOWN AND RESTART PROCEDURES

BACKGROUND OF THE INVENTION

1. Field of the Invention

The present invention relates to a computer program product, system, and method for managing metadata for caching devices during shutdown and restart procedures.

2. Description of the Related Art

In distributed storage systems, one or more storage servers serve data to storage clients. The storage clients are equipped with local caches that use non-volatile memories to locally cache data for faster access. These memories are typically Flash, Phase Change Memory, etc. The storage server uses a coherency protocol to manage the coherence of the data at different clients, ensuring that each client will have the most up-to-date copy of data managed by the storage server for data maintained in the client local cache so that no stale data will be served to the user that accesses data through one of the clients.

In the event of a power cycle, the clients need to communicate with the storage server to discover what data should be purged. purge data that may be invalid.

SUMMARY

A computer program product, system, and method for managing metadata for caching devices during shutdown and restart procedures. Fragment metadata for each fragment of data from the storage server stored in the cache device is generated. The fragment metadata is written to at least one chunk of storage in the cache device in a metadata directory in the cache device. For each of the at least one chunk in the cache device to which the fragment metadata is written, chunk metadata is generated for the chunk and writing the generated chunk metadata to the metadata directory in the cache device. Header metadata having information on access of the storage server is written to the metadata directory in the cache device. The written header metadata, chunk metadata, and fragment metadata are used to validate the metadata directory and the fragment data in the cache device during a restart operation.

BRIEF DESCRIPTION OF THE DRAWINGS

FIG. 2 illustrates an embodiment of a metadata directory.
FIG. 3 illustrates an embodiment of fragment metadata.
FIG. 7 illustrates an embodiment of a computer architecture used with described embodiments.

DETAILED DESCRIPTION

Described embodiments provide techniques for a caching client having one or more non-volatile caching devices to generate metadata for fragment data stored in a non-volatile caching device during a shutdown operation. The generated metadata is stored with the cached data in the caching devices. During a restart operation, the metadata and permissions are validated so that the metadata may be reused for the cached fragment data in a manner that minimizes coordination with the storage server to regain permissions related to caching after the restart.

Figure 1:
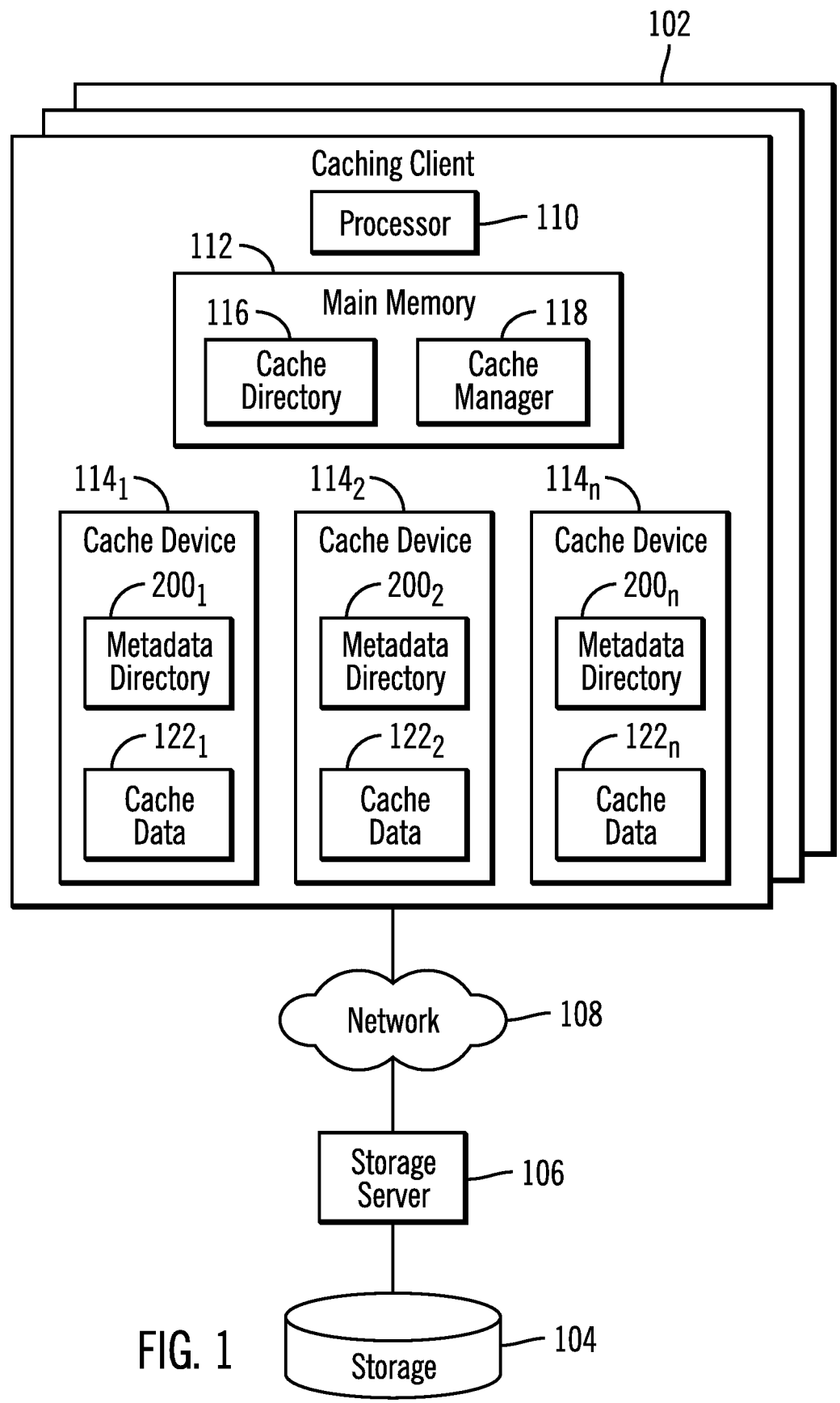
FIG. 1 illustrates an embodiment of a storage environment.

FIG. 1 illustrates a computing environment having one or more caching clients 102 that cache data from a storage 104 managed by a storage server 106 the caching clients 102 access over a network 108. The caching clients 102 may provide cached data from the storage server 104 to applications and hosts on the same or different systems.

Each caching client 102 includes a processor 110, comprising one or more central processing units (CPUs) or cores, a main memory 112 and one or more cache devices $114_1$, $114_2 \ldots 114_n$ comprising non-volatile storage to cache data form the storage server 104. The main memory 112 includes a cache directory 116 having information on storage 106 data cached in the cache devices cache devices $114_1$, $114_2 \ldots 114_n$ and a cache manager 118 to manage the cache devices cache devices $114_1$, $114_2 \ldots 114_n$. Each cache device $114_1$, $114_2 \ldots 114_n$ includes a metadata directory $200_1$, $200_2 \ldots 200_n$ having information on the cache data $122_1$, $122_2 \ldots 122_n$ stored in the cache devices $114_1$, $114_2 \ldots 114_n$.

The network 108 may comprise a Storage Area Network (SAN), Wide Area Network (WAN), Local Area Network (LAN), the Internet, and Intranet, a wireless network, wired network, etc.

The storage 104 may comprise different types or classes of storage devices, such as a solid state storage device (SSD) comprised of solid state electronics, such as a EEPROM (Electrically Erasable Programmable Read-Only Memory), flash memory, Phase Change Memory, flash disk, Random Access Memory (RAM) drive, storage-class memory (SCM), etc., magnetic storage disk, optical disk, tape, etc. The storage may further be configured from an array of devices, such as Just a Bunch of Disks (JBOD), Direct Access Storage Device (DASD), Redundant Array of Independent Disks (RAID) array, virtualization device, etc. Further, the storage 120 may comprise heterogeneous storage devices from different vendors.

The cache devices $114_1$, $114_2 \ldots 114_n$ may comprise a non-volatile memory or storage device, such as a solid state storage device (SSD) comprised of solid state electronics, such as a EEPROM (Electrically Erasable Programmable Read-Only Memory), flash memory, Phase Change Memory, flash disk, etc.

The main memory 112 may comprise one or more volatile or non-volatile memory devices. The cache manager 118 may be implemented as a program code loaded into the memory 112 and executed by the processor 110 or may be implemented with hardware logic, such as an Application Specific Integrated Circuit (ASIC).

FIG. 2 illustrates an embodiment of a metadata directory 200, such as metadata directories $200_1$, $200_2 \ldots 200_n$, including header metadata 400 having general information on the metadata directory $200_1$, $200_2 \ldots 200_n$, chunk metadata 204 on one or more chunks $206_1 \ldots 206_n$ in the metadata directory 200 to which one or more instances of fragment metadata $208_1 \ldots 208_n$ are written, where each instance of fragment metadata is represented as an "FMD" block.

The variable "n" as used herein to represent a certain number of instances of an element, such as cache devices $114_n$, metadata directory $200_n$, cache data $122_n$, etc., may indicate any integer number of an element, and the variable number "n" when used to indicate a number for different elements may indicate the same or different number of those elements.

FIG. 3 illustrates an embodiment of fragment metadata 300, such as the FMD blocks $208_1 \ldots 208_n$, where each instance of fragment metadata 300 may include a logical device identifier (ID) 302, such as a Logical Unit number (LUN) identifier, identifying a LUN or logical device in the storage 104 from which the fragment originated; a fragment identifier (ID) 304 identifying the fragment in the cache data $122_1, 122_2 \ldots 122_n$; a sector bitmap 306 comprising a bitmap for the F sectors of the fragment, where F is the fragment size, and a set bit indicates a valid sector; and a cache device location 308 indicating an offset in the cache device $114_1$, $114_2 \ldots 114_n$ where the fragment data is stored.

Figure 4:
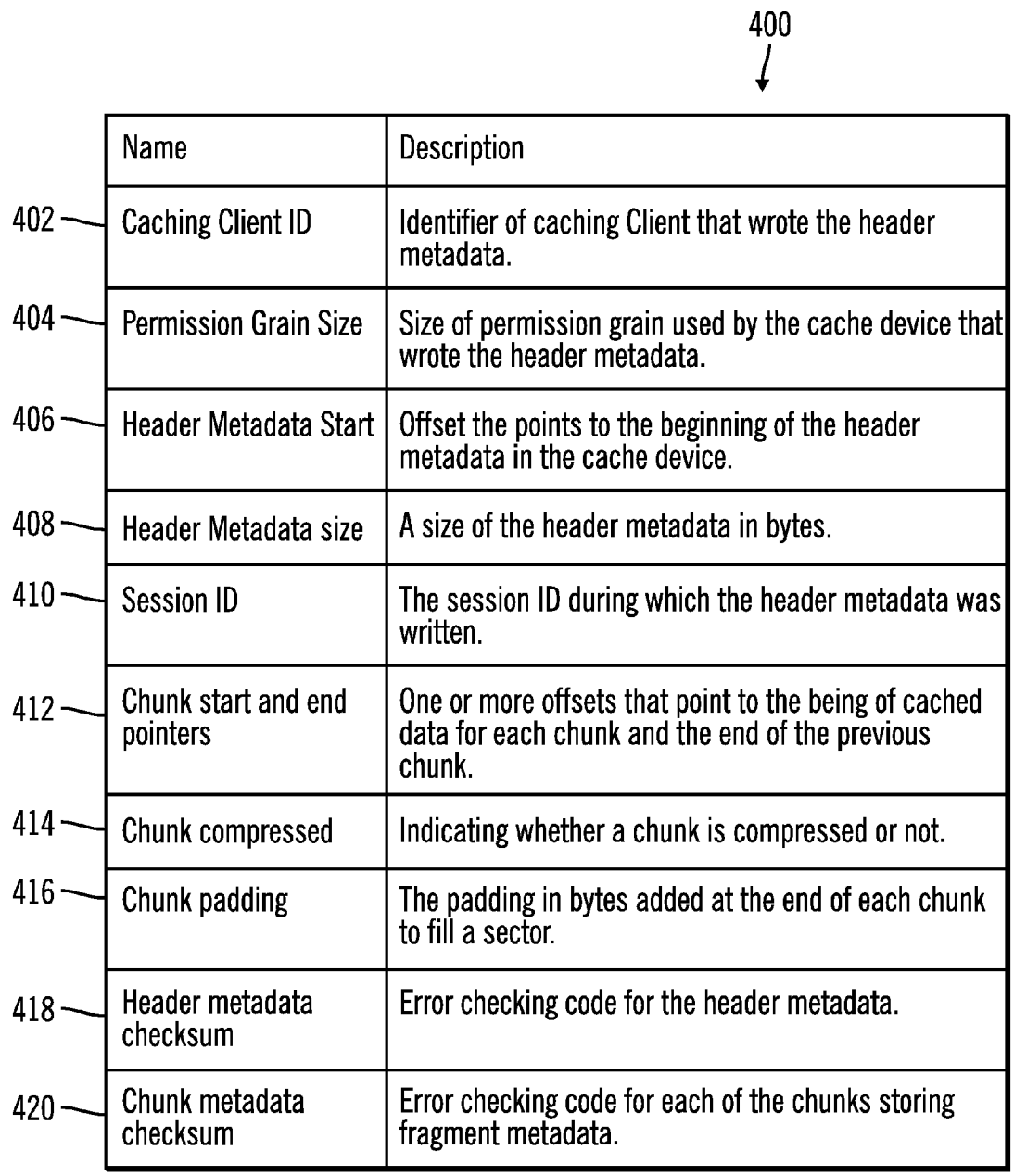
FIG. 4 illustrates an embodiment of header metadata.

FIG. 4 illustrates an embodiment of the header metadata 400 including chunk metadata 204. The header metadata 400 includes a caching client identifier (ID) 402 identifying the caching client 102 that wrote the header metadata 400; a permission grain size 404 indicating a permission grain size that the storage server 106 granted to the cache client 102 for accessing data from the storage 104; a header metadata start 406 indicating an offset in the cache device $114_1, 114_2 \ldots 114_n$ at which the header metadata 400 begins; a header metadata size 408 comprising a size of the header metadata 400 in bytes; a session identifier 410 indicating a session during which the header metadata 400 was written; chunk start and end pointers 412 providing a pair of start and end pointers for each chunk $206_1 \ldots 206_n$ to which fragment metadata $208_1 \ldots 208_n$ is written; a chunk compressed indicator 414 indicating whether the fragment metadata in the chunks $206_1 \ldots 206_n$ is compressed; chunk padding 416 indicating for each chunk $206_1 \ldots 206_n$ the bytes added at the end of the chunk; header metadata checksum 418 providing an error checking code calculated from all the header metadata 418, which may include the chunk metadata; and a chunk metadata checksum 420 comprising an error checking code calculated from the chunks $206_1 \ldots 206_n$ storing the fragment metadata $208_1 \ldots 208_n$.

In the embodiment of FIG. 4, the chunk metadata 204, such as fields 412, 414, 416, and 420, is included in the header metadata 400, such that the header metadata checksum 418 is calculated additionally from the chunk metadata 204. In alternative embodiments, the chunk metadata 204 may be maintained separate from the header metadata 400.

Figure 5A:
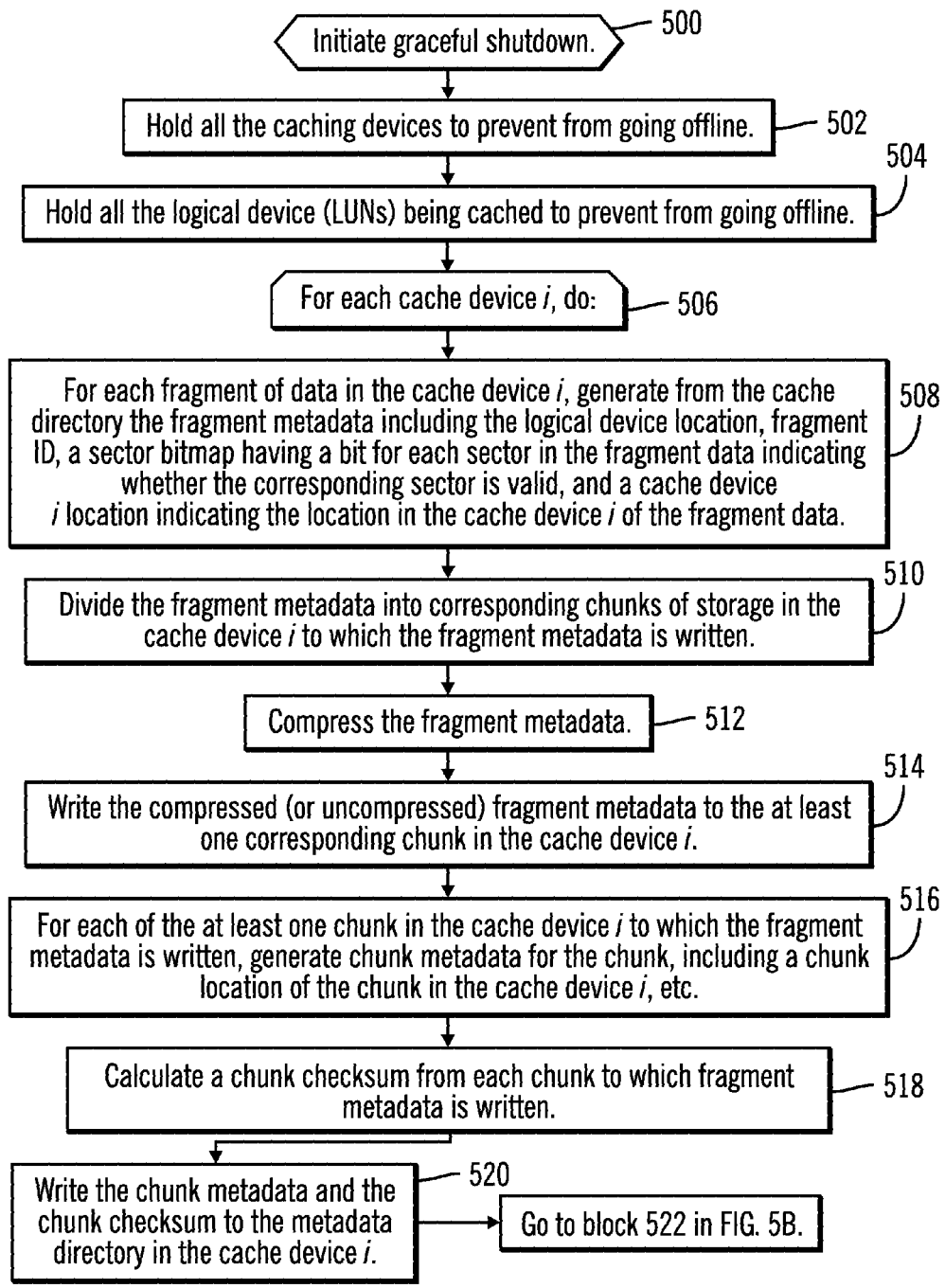
FIGS. 5a and 5b illustrate an embodiment of operations to perform a shutdown of a caching client.
Figure 5B:
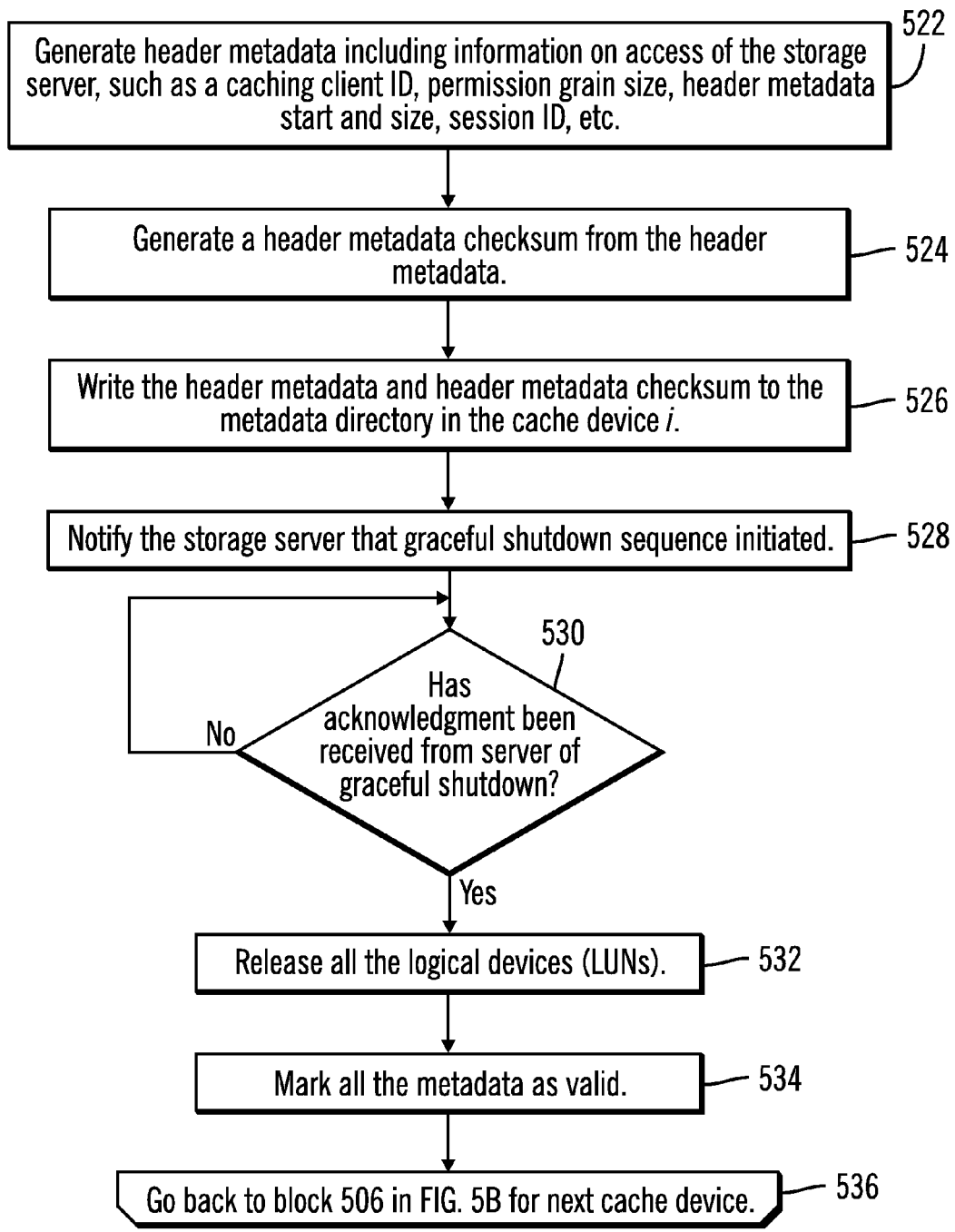

FIGS. 5a and 5b illustrate an embodiment of operations performed by the cache manager 118 to perform a graceful shutdown of the one or more cache devices $114_1, 114_2 \ldots 114_n$ in the cache client 102. Upon initiating (at block 500) a graceful shutdown, the cache manager 118 holds (at block 502) all the cache devices $114_1, 114_2 \ldots 114_n$ to prevent them from going into an offline state during the shutdown procedure. All the logical devices, e.g., LUNs, subject to being cached in the cache devices $114_1, 114_2 \ldots 114_n$, are also held (at block 504) from going offline for the caching client 102. For each cache device i, comprising one of the cache devices $114_1, 114_2 \ldots 114_n$, the cache manager 118 performs a loop (from blocks 506 through 536) of the operations at blocks 508 through 534. For each fragment of data stored in the cache device i, the cache manager 118 generates (at block 508) from the cache directory 116 the fragment metadata $208_1 \ldots 208_n$ including a logical device ID 302 of the logical device in the storage 104 having the fragment data, a fragment identifier 304, a sector bitmap 306 having a bit for each sector in the fragment data indicating whether the corresponding sector is valid, and a cache device location 308 indicating the location in the cache device i of the fragment data.

The cache manager 118 divides (at block 510) the generated fragment metadata $208_1 \ldots 208_n$ into corresponding chunks $206_1 \ldots 206_n$ of storage in the cache device i to which the fragment metadata $208_1 \ldots 208_n$ is to be written. The fragment metadata $208_1 \ldots 208_n$ may optionally be compressed (at block 512). The compressed (or uncompressed) fragment metadata $208_1 \ldots 208_n$ is written (at block 514) to the at least one corresponding chunk $206_1 \ldots 206_n$ in the cache device i. For each of the at least one chunk $206_1 \ldots 206_n$ in the cache device i to which the fragment metadata $208_1 \ldots 208_n$ is written, the cache manager 118 generates (at block 516) chunk metadata 204 for the chunk $206_1 \ldots 206_n$, including a chunk location 412 of the chunk in the cache device i, and other chunk information, e.g., 414, 416. The cache manager 118 calculates (at block 518) a chunk checksum 420 from each chunk $206_1 \ldots 206_n$ to which fragment metadata is written. The chunk metadata 204 and the chunk checksum 420 are written (at block 520) to the metadata directory 200 in the cache device i. Control then proceeds to block 522 in FIG. 5b.

At block 522, the cache manager 118 generates (at block 522) header metadata 400 including a caching client ID 402, permission grain size 404, header metadata start 406 and size 408, session ID 410, etc. A header metadata checksum 418 is generated (at block 524) from the header metadata 400. The cache manager 118 writes (at block 526) the header metadata 400 and header metadata checksum 418 to the metadata directory 200 in the cache device i. The cache manager 118 then notifies (at block 528) the storage server 106 that a graceful shutdown sequence was initiated. Upon receiving (at block 530) acknowledgment from the storage server 106 of the graceful shutdown notification, the cache manager 118 releases (at block 532) all the logical devices (LUNs) having data cached at the caching client 2 and marks (at block 534) all the metadata in the metadata directory 200 as valid.

In described embodiments, the metadata for the fragments is generated and written during a shutdown operation. In alternative embodiments, certain of the metadata may be written during normal operations.

Figure 6A:
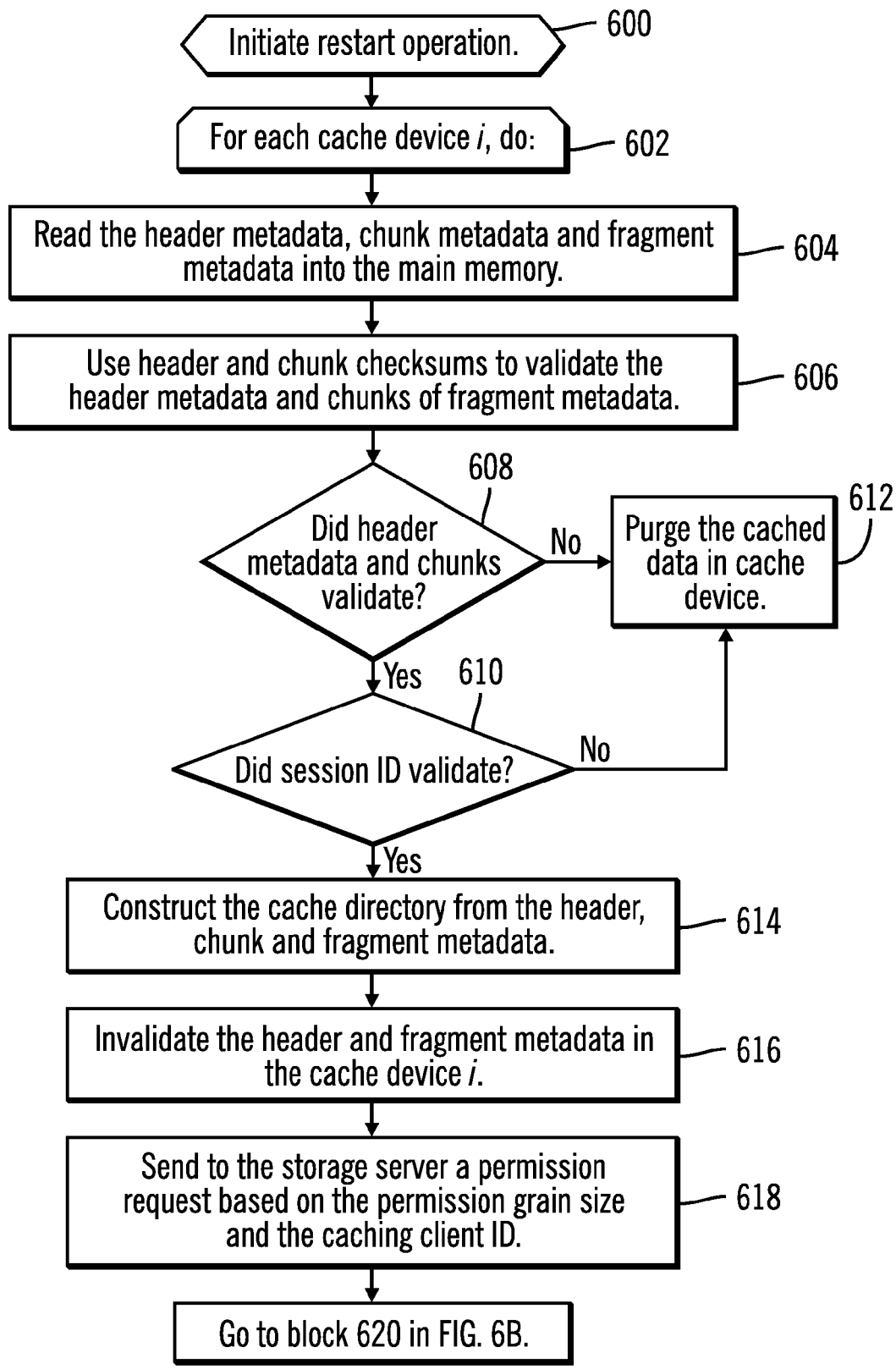
FIGS. 6a and 6b illustrate an embodiment of operations to perform a restart of a caching client.
Figure 6B:
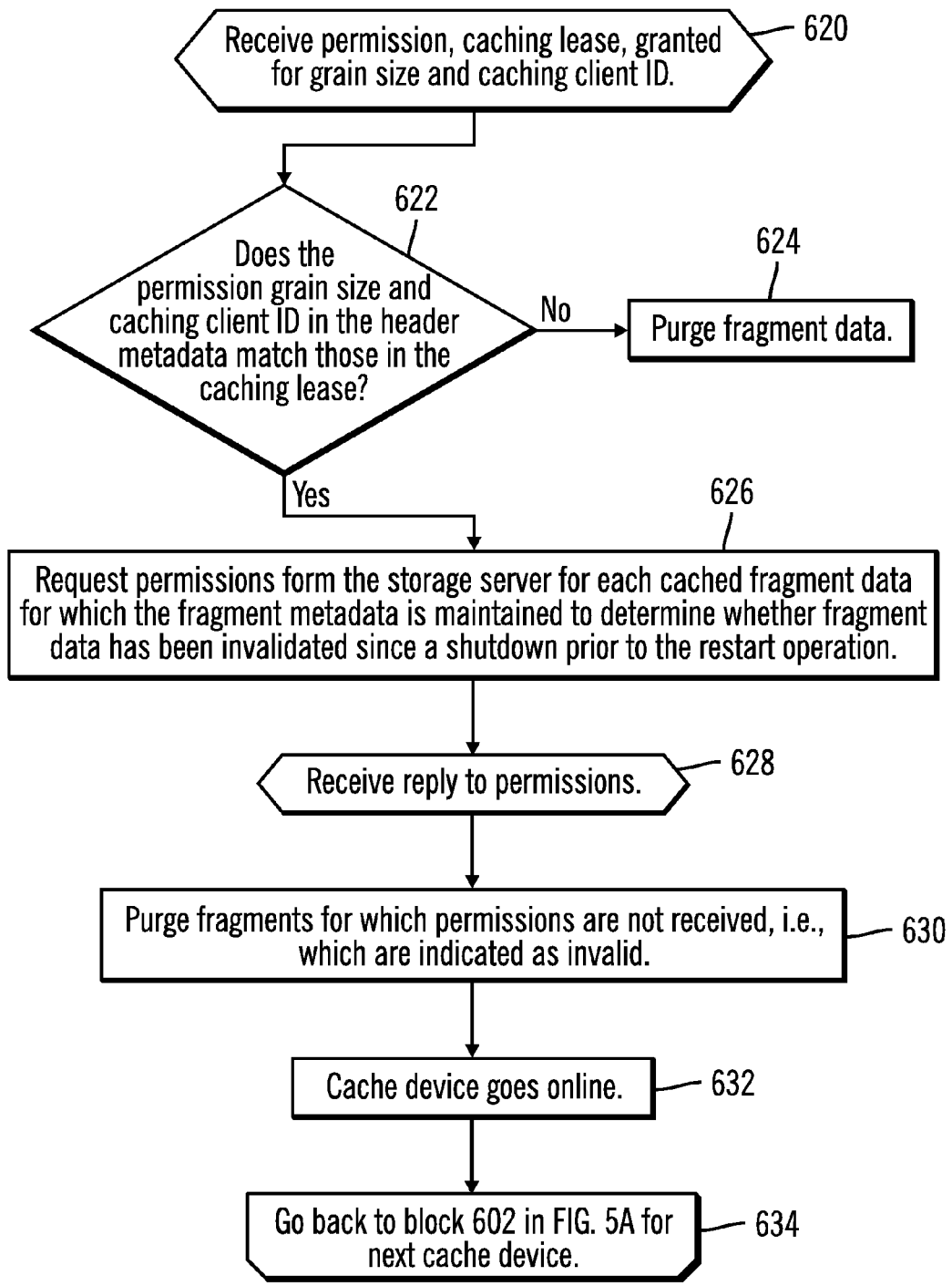

FIGS. 6a and 6b illustrate an embodiment of operations performed by the cache manager 118 to perform a warm start after the graceful shutdown of FIGS. 5a and 5b. Upon initiating (at block 600) the restart operation, the cache manager 118 performs a loop (from blocks 602 through 634) of the operations at blocks 604 through 632 for each cache device i, comprising one of the cache devices $114_1, 114_2 \ldots 114_n$. For cache device i, the cache manager 118 reads (at block 604) the header 400, chunk 204, and fragment metadata $208_1 \ldots 208_n$ into the main memory 112. The cache manager 118 uses (at block 606) the header 418 and chunk 420 checksums to validate the header metadata 400 and chunks of fragment metadata $208_1 \ldots 208_n$. If (at block 608) the header 400 and chunks $206_1 \ldots 206_n$ validated, then the cache manager 118 validates (at block 610) the session ID 410, which may involve checking whether the current session matches the session ID 410. If the header and chunks did not validate (from the no branch of block 608) or the session ID 410 did not validate (from the no branch of block 610), then the cached data $122_i$ is invalidated and purged (at block 612).

Otherwise, if validation occurred (from the yes branches of blocks 608 and 610), then the cache manager 118 constructs (at block 614) the cache directory 116 from the header 400, chunk 204, and fragment metadata $208_1 \ldots 208_n$. The header 400 and fragment metadata $208_1 \ldots 208_n$ in the metadata directory 200 in the cache device i are invalidated (at block 616). The cache manager 118 sends (at block 618) to the storage server 106 a permission request based on the permission grain size 404 and the client caching device ID 402. Control proceeds to block 620 in FIG. 6b.

Upon receiving (at block 620) permission from the storage server 106, such as a caching lease, granted for a permission grain size caching client ID, the cache manager 118 determines (at block 622) whether the permission grain size 404 and caching client ID 402 in the header metadata 400 match those in the caching lease from the storage server 106. If not, then the fragment data is purged (at block 624). If (at block 622) the permission grain size 404 and caching client ID 402 match those in the caching lease, then the cache manager 118 requests (at block 626) permissions form the storage server 106 for each cached fragment data for which the fragment metadata $208_1 \ldots 208_n$ is maintained to determine whether fragment data has been invalidated since a shutdown prior to the restart operation. The storage server 106 may determine whether the fragment data for which permission is requested has been changed since the shutdown, which would mean that the cached data at the caching client 102 is invalid. Upon receiving (at block 628) the permissions for the fragment data, the cache manager 118 purges (at block 630) fragments from the cache device i for which permissions are not received, i.e., which are determined to be invalid. The cache device i goes online (at block 632).

In certain embodiments, the cache manager 118 may only generate the metadata for fragments during a shutdown procedure to avoid having to constantly update the metadata directory when the fragment data is changed during normal operations. The header metadata 400 and fragment metadata $208_1 \ldots 208_n$ are used to verify the integrity of the metadata after a reboot operation to determine whether the previously generated metadata during the shutdown can be used with the fragment data in the cache devices $114_1, 114_2 \ldots 114_n$. Further, the metadata directory 200 is read during restart operations, but not accessed during normal caching operations.

With described embodiments, a single cache manager 118 may recover cached data from each of a plurality of cache devices $114_1, 114_2 \ldots 114_n$ independently. Each cache device $114_1, 114_2 \ldots 114_n$ stores the metadata relevant to the cached data in its own metadata directory 200. Further, the non-volatile nature of the caching device medium (e.g., Flash memory) guarantees that the cached data will persist across power cycles. The metadata directory 200 allows identification of cached data in the caching devices $114_1, 114_2 \ldots 114_n$.

With described embodiments, each one of the caching clients 102 can reuse as much cached data as possible after a power cycle. Further, the network traffic required for synchronization between the caching clients 102 and the storage server 106 after a client power cycle is minimized because only permissions for the caching license, e.g., grain size and caching client 102, and permissions for the fragment data are requested. Yet further, the described caching scheme guarantees correctness in the presence of a client crash or in the presence of other writers writing to the cached data a the caching client 102 is offline.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the Figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The caching clients 102 and storage server 106 and components therein, may be implemented in one or more computer systems, such as the computer system 702 shown in FIG. 7. If the components of the network computing environment of FIG. 1 are implemented in multiple systems, then the systems may communicate over the network 108. Computer system/server 702 may be described in the general context of computer system executable instructions, such as program modules, being executed by a computer system. Generally, program modules may include routines, programs, objects, components, logic, data structures, and so on that perform particular resources or implement particular abstract data types. Computer system/server 702 may be practiced in distributed cloud computing environments where resources are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 716 which generally carry out the functions and/or methodologies of embodiments of the invention as described herein.

Computer system/server 702 may also communicate with one or more external devices 718 such as a keyboard, a pointing device, a display 720, etc.; one or more devices that enable a user to interact with computer system/server 12; and/or any devices (e.g., network card, modem, etc.) that enable computer system/server 702 to communicate with one or more other computing devices. Such communication can occur via Input/output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for caching data from a storage device managed by a storage server in a cache device providing non-volatile storage, the computer program product comprising a computer readable storage medium having computer readable program code embodied therein that is executable to perform operations, the operations comprising:
    generating fragment metadata for each fragment of data from the storage server stored in the cache device;
    writing the fragment metadata to at least one chunk of storage in the cache device in a metadata directory in the cache device;
    for each of the at least one chunk in the cache device to which the fragment metadata is written, generating chunk metadata for the chunk and writing the generated chunk metadata to the metadata directory in the cache device;
    writing header metadata having information on access of the storage server to the metadata directory in the cache device; and
    using the written header metadata, chunk metadata, and fragment metadata to validate the metadata directory and the fragment data in the cache device during a restart operation.

2. The computer program product of claim 1, wherein the operations performed as part of the restart operation further comprise:
    validating the header metadata and chunks of fragment metadata;
    constructing a cache directory from information in response to validating the header metadata;
    indicating the header metadata as invalid; and
    requesting permission from the storage server to access the cached fragment data.

3. The computer program product of claim 1, wherein the operations performed as part of the restart operation further comprise:
    constructing a cache directory from the fragment metadata;
    indicating the fragment metadata as invalid;
    requesting permission from the storage server to use the fragment data stored in the cache device; and
    using the cached fragment data for which permission is granted.

4. The computer program product of claim 3, wherein the restart operations further comprise:
    purge fragment data in the cache device for which the storage server does not grant permission.

5. The computer program product of claim 1, wherein the fragment metadata includes a logical device in the storage device of the fragment data, a sector bitmap having a bit for each sector in the fragment data indicating whether the corresponding sector is valid, and a cache device location indicating the location in the cache device of the fragment data.

6. The computer program product of claim 1, wherein the chunk metadata includes for each of the at least one chunk to which the fragment metadata is written a chunk location indicating the location of the chunk having the fragment metadata in the cache device, and a chunk checksum of the fragment metadata written to the chunk, wherein further performing during the restart operation:
    validating each chunk of fragment metadata in the cache device using the chunk checksum, wherein the metadata in the metadata directory and the fragment data in the cache device are not validated if the chunk of fragment metadata is not validated using the chunk checksum.

7. The computer program product of claim 1, wherein the header metadata includes a permission grain size and caching client identifier, wherein the operations during the restart operation further comprise:
    sending to the storage server a permission request based on the permission grain size and the caching client identifier, wherein the fragment data in the cache device is not reused after the restart operation if the storage server does not grant permission in response to the permission request.

8. The computer program product of claim 7, wherein the header metadata includes a header checksum, wherein further performing during the restart operation:
    validating the header metadata in the metadata directory in the cache device using the header checksum, wherein the fragment data in the cache device is not reused after the restart operation if the header metadata is not validated using the header checksum.

9. The computer program product of claim 1, wherein the fragment data from the storage device managed by the storage server is cached in a plurality of cache devices, wherein the operations of generating the fragment metadata, writing the fragment metadata, creating and writing the chunk metadata, writing the header metadata, and using the written header metadata, chunk metadata, and fragment metadata during the restart operations are performed for each of the plurality of cache devices.

10. The computer program product of claim 1, wherein the operations further comprise:
    initiating a shutdown operation, wherein the operations of generating the fragment metadata, writing the fragment metadata, creating and writing the chunk metadata, and writing the header metadata to the metadata directory in the cache device are performed in response to initiating the shutdown operation, wherein the restart operation follows the shutdown operation.

11. A system for caching data from a storage device managed by a storage server, comprising:
a cache device providing non-volatile storage;
a processor; and
a computer readable storage medium having program code executed by the processor to perform operations, the operations comprising:
generating fragment metadata for each fragment of data from the storage server stored in the cache device;
writing the fragment metadata to at least one chunk of storage in the cache device in a metadata directory in the cache device;
for each of the at least one chunk in the cache device to which the fragment metadata is written, generating chunk metadata for the chunk and writing the generated chunk metadata to the metadata directory in the cache device;
writing header metadata having information on access of the storage server to the metadata directory in the cache device; and
using the written header metadata, chunk metadata, and fragment metadata to validate the metadata directory and the fragment data in the cache device during a restart operation.

12. The system of claim 11, wherein the operations performed as part of the restart operation further comprise:
validating the header metadata and chunks of fragment metadata;
constructing a cache directory from information in response to validating the header metadata;
indicating the header metadata as invalid; and
requesting permission from the storage server to access the cached fragment data.

13. The system of claim 11, wherein the operations performed as part of the restart operation further comprise:
constructing a cache directory from the fragment metadata;
indicating the fragment metadata as invalid;
requesting permission from the storage server to use the fragment data stored in the cache device; and
using the cached fragment data for which permission is granted.

14. The system of claim 11, wherein the chunk metadata includes for each of the at least one chunk to which the fragment metadata is written a chunk location indicating the location of the chunk having the fragment metadata in the cache device, and a chunk checksum of the fragment metadata written to the chunk, wherein further performing during the restart operation:
validating each chunk of fragment metadata in the cache device using the chunk checksum, wherein the metadata in the metadata directory and the fragment data in the cache device are not validated if the chunk of fragment metadata is not validated using the chunk checksum.

15. The system of claim 11, wherein the header metadata includes a permission grain size and caching client identifier, wherein the operations during the restart operation further comprise:
sending to the storage server a permission request based on the permission grain size and the caching client identifier, wherein the fragment data in the cache device is not reused after the restart operation if the storage server does not grant permission in response to the permission request.

16. The system of claim 11, wherein the fragment data from the storage device managed by the storage server is cached in a plurality of cache devices, wherein the operations of generating the fragment metadata, writing the fragment metadata, creating and writing the chunk metadata, writing the header metadata, and using the written header metadata, chunk metadata, and fragment metadata during the restart operations are performed for each of the plurality of cache devices.

17. The system of claim 11, wherein the operations further comprise:
initiating a shutdown operation, wherein the operations of generating the fragment metadata, writing the fragment metadata, creating and writing the chunk metadata, and writing the header metadata to the metadata directory in the cache device are performed in response to initiating the shutdown operation, wherein the restart operation follows the shutdown operation.

18. A method for caching data from a storage device managed by a storage server in a cache device providing non-volatile storage, comprising:
generating fragment metadata for each fragment of data from the storage server stored in the cache device;
writing the fragment metadata to at least one chunk of storage in the cache device in a metadata directory in the cache device;
for each of the at least one chunk in the cache device to which the fragment metadata is written, generating chunk metadata for the chunk and writing the generated chunk metadata to the metadata directory in the cache device;
writing header metadata having information on access of the storage server to the metadata directory in the cache device; and
using the written header metadata, chunk metadata, and fragment metadata to validate the metadata directory and the fragment data in the cache device during a restart operation.

19. The method of claim 18, wherein the operations performed as part of the restart operation further comprise:
validating the header metadata and chunks of fragment metadata;
constructing a cache directory from information in response to validating the header metadata;
indicating the header metadata as invalid; and
requesting permission from the storage server to access the cached fragment data.

20. The method of claim 18, wherein the operations performed as part of the restart operation further comprise:
constructing a cache directory from the fragment metadata;
indicating the fragment metadata as invalid;
requesting permission from the storage server to use the fragment data stored in the cache device; and
using the cached fragment data for which permission is granted.

21. The method of claim 18, wherein the chunk metadata includes for each of the at least one chunk to which the fragment metadata is written a chunk location indicating the location of the chunk having the fragment metadata in the cache device, and a chunk checksum of the fragment metadata written to the chunk, wherein further performing during the restart operation:
validating each chunk of fragment metadata in the cache device using the chunk checksum, wherein the metadata in the metadata directory and the fragment data in the cache device are not validated if the chunk of fragment metadata is not validated using the chunk checksum.

22. The method of claim 18, wherein the header metadata includes a permission grain size and caching client identifier, wherein the operations during the restart operation further comprise:

sending to the storage server a permission request based on the permission grain size and the caching client identifier, wherein the fragment data in the cache device is not reused after the restart operation if the storage server does not grant permission in response to the permission request.

23. The method of claim 18, wherein the fragment data from the storage device managed by the storage server is cached in a plurality of cache devices, wherein the operations of generating the fragment metadata, writing the fragment metadata, creating and writing the chunk metadata, writing the header metadata, and using the written header metadata, chunk metadata, and fragment metadata during the restart operations are performed for each of the plurality of cache devices.

24. The method of claim 18, further comprising:

initiating a shutdown operation, wherein the operations of generating the fragment metadata, writing the fragment metadata, creating and writing the chunk metadata, and writing the header metadata to the metadata directory in the cache device are performed in response to initiating the shutdown operation, wherein the restart operation follows the shutdown operation.

* * * * *